United States Patent [19]
Weinstein

[11] 3,754,545
[45] Aug. 28, 1973

[54] BLOOD PRESSURE RECORDING DEVICE WITH IMPROVED RECORD

[75] Inventor: Berel Weinstein, New York, N.Y.

[73] Assignee: Bio-Medical Sciences, Inc., Fairfield, N.J.

[22] Filed: June 22, 1970

[21] Appl. No.: 47,938

Related U.S. Application Data

[62] Division of Ser. No. 749,518, Aug. 1, 1968, Pat. No. 3,557,779.

[52] U.S. Cl............... 128/2.05 Q, 73/391, 346/102, 346/131, 346/137
[51] Int. Cl............................................. A61b 5/02
[58] Field of Search............... 128/2.05 A, 2.05 R, 128/2.05 G, 2.05 Q; 346/102, 121, 122, 131, 137; 73/391

[56] References Cited
UNITED STATES PATENTS

| | | | |
|---|---|---|---|
| 2,152,303 | 3/1939 | Cunningham | 346/137 |
| 2,993,741 | 7/1961 | Malthy et al. | 346/102 |
| 1,373,204 | 3/1921 | Phelps | 346/137 |
| 2,753,863 | 7/1956 | Bailey | 128/2.05 G |
| 2,379,573 | 7/1945 | Gilson | 128/2.05 A |
| 3,117,570 | 1/1964 | Halasz et al. | 128/2.05 M |
| 2,980,107 | 4/1961 | Hurley et al. | 128/2.05 Q |
| 1,906,806 | 5/1933 | Plesch | 128/2.05 Q |
| 1,532,705 | 4/1925 | Levin | 128/2.05 Q |
| 2,425,899 | 8/1947 | Sheiffele | 128/2.05 Q |

*Primary Examiner*—William E. Kamm
*Attorney*—Irving Seidman

[57] ABSTRACT

A device for recording the blood pressure of a person comprising a cuff adapted to encircle a limb such as an arm of a person. Pressure regulating means is provided to inflate the cuff to a predetermined pressure and to deflate the cuff when the pressure reaches a preselected value. A record is mounted on a movable support, both of which are mounted on the cuff. The support is adapted to move in response to the pressure of said cuff. Writing means is provided for indicating blood pressures on the record. Actuating means responsive to the pulse beats of a person operates the writing means so that the device produces a graphic record of the blood pressure of the person undergoing examination.

1 Claim, 5 Drawing Figures

PATENTED AUG 28 1973
3,754,545
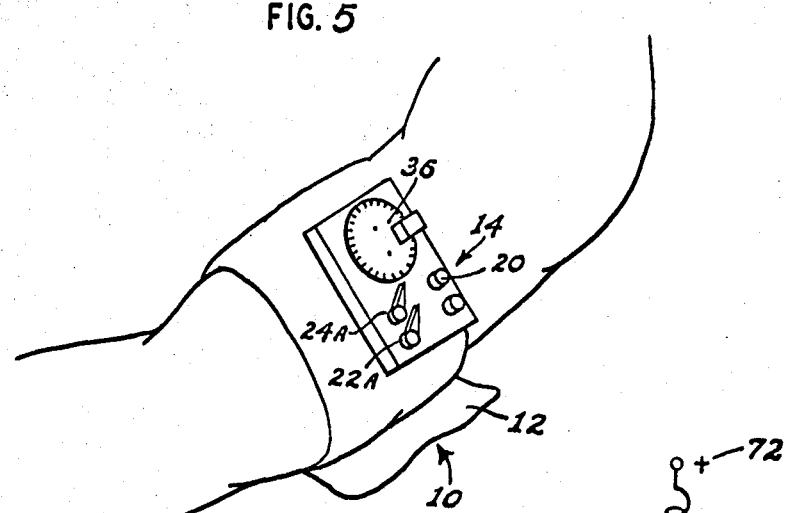
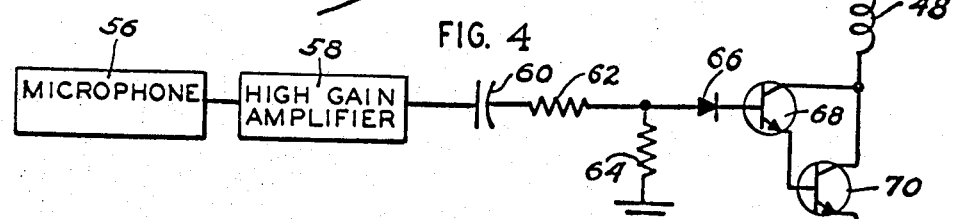
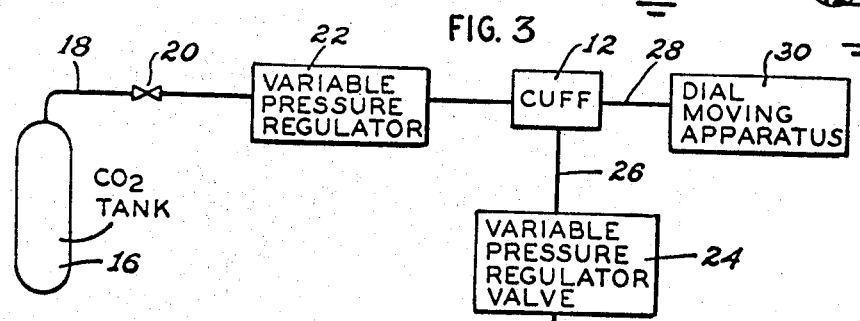
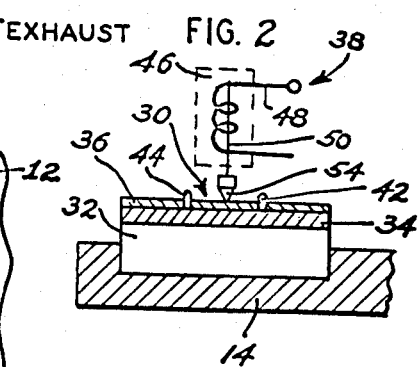
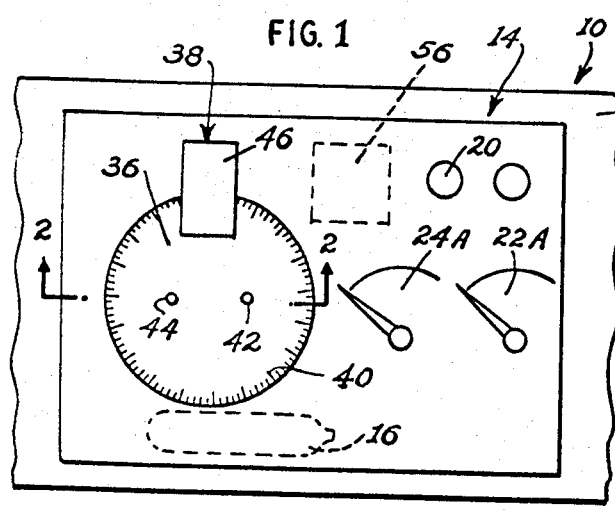
INVENTOR.
BEREL WEINSTEIN
BY
*Irving Seidman*
ATTORNEY

BLOOD PRESSURE RECORDING DEVICE WITH IMPROVED RECORD

The application is a division of applicant's copending application U. S. Ser. No. 749,518, filed Aug. 1, 1968 and now U.S. Pat. No. 3,557,779.

This invention relates to a measuring device for measuring the blood pressure of a person and, more particularly, pertains to a device which produces a written record of the blood pressure characterstics of a person.

Presently, blood pressures are measured by means of a device commonly known as a sphygnomanometer, In operation, an inflatable cuff is applied to the arm of the person being examined. The cuff is inflated to a particular pressure and a stethoscope is placed on the arm of the person, below the cuff. The pressure in the cuff is released gradually until the first pulse bear is detectdd by the examinder, thereby indicating the systole. The examiner continues listening to the pulse until the intensity of the pulse beat reaches a normal level, thereby indicating the diastole. In view of the fact that the systolic and diastolic blood pressure points are dependent upon the ability of the examiner to detect abnormal and normal pulse beats, it is not unnatural for two different examiners to read two completely different blood pressures of the same person although they may be taken at the same time. Additionally, it requires many years of practice for an examiner to become proficient in detecting pulse beats during blood pressure examinations. Forthermore, it has been found that the ambient noise level affects blood pressure readings since it becomes difficult to determine the point at which the pulse beat becomes normal in noisy surroundings. Accordingly, it has been found to be practically impossible to take accurate blood pressure readings in wards or the like.

In addition to the above, further disadvantages associated with sphygnomanometers reside in the face that the examiner is required to manipulate the pressure valves associated with the cuff simultaneously with the reading of the device, thereby further increasing the difficulty of taking accurate readings. Moreover, after taking the readings, the examiner usually is required to transcribe the readings onto a chart. Hence, there is additional room for error due to errors in transcribing the information.

Accordingly, an object of the present invention is to provide an improved device for taking the blood pressure of a person.

Another object of the invention is to provide a blood pressure device which provides the examiner with a permanent record of the systolic and diastolic pressures.

A further object and feature of the invention resides in the novel details of construction which provide a blood pressure device of the type described wherein the systole and diastole are automatically and accurately determined.

Another object of the present invention is the provision of a reliable blood pressure indicating device which is compact and relatively easy to use.

Accordingly, a blood pressure recording device constructed in accordance with the present invention includes pressure means for applying pressure to an area of the body. Record means having pressure points designated thereon is provided and writing means responsive to the intensity of the pulse beats of a person is adapted to produce the systole and diastole on the record. Additionally, the device includes moving means for moving one of the writing means or the record relative to the other in response to the pressure of said pressure means thereby to produce a permanent record of the blood pressure of the person being examined.

Other features and advantages of the present invention will become more apparent from a consideration of the following detailed description when taken in conjunction with the drawing, in which:

FIG. 1 is a top plan view of a blood pressure recording device constructed in accordance with the present invention;

FIG. 2 is an enlarged detailed view, partially in schematic form, of the writing mechanism of the present invention;

FIG. 3 is a block diagram of the pressure system of the invention;

FIG. 4 is a schematic circuit wiring diagram, partially in block diagram form, of the electrical portion of the invention; and FIG. 5 is a perspective view of the device on the arm of a patient.

Accordingly, a blood pressure recording device for graphically determining the blood pressure of a person is shown in FIG. 1 and designated generally by the reference numeral 10. The device 10 includes a conventional cuff 12 that is adapted to be wrapped about a limb such as the arm of the person to be examined, and to be secured thereto. Within the cuff 12 is a chamber (not shown) that is adapted to be filled with a fluid under pressure, such as air, to apply a pressure to the arm of the person. Received on the cuff 12 is a housing 14 which contains the means for inflating the cuff and recording the blood pressure.

More particularly, the housing 14 contains a source of fluid under pressure such as a cartridge 16 containing carbon dioxide under pressure. (See FIG. 3) The tank 16 is connnected to the cuff 12 by a conduit 18 through a shut-off valve 20 and a normally open variable pressure regulating valve 22. The cuff 12 exhausts to the atmosphere through another normally closed variable pressure regulating valve 24 via a conduit 26. Also communicating with the cuff 12, by means of a conduit 28, is a record moving apparatus designated generally by the reference numeral 30.

The record moving apparatus 30 includes an aneroid-type mechanism 32 having a rotatable platform or support 34. The mechanism 32 is adapted to rotate the platform 34 in accordance with the pressure of the cuff 12. That is, the angular position of the platform 34 will be dependent upon the pressure of the cuff 12 since the aneroid-type mechanism is responsive to the value of pressure in the cuff. Hence, as the pressure varies in the cuff, the angular displacement of the platform relative to a particular reference point will likewise vary. The mechanism 32 is of conventional construction and, accordingly, is not disclosed in detail herein.

Mounted upon the platform 34 is a record which is adapted to be moved past a writing station designated generally by the reference numeral 38. More particularly, the record 36 comprises a disc having graduations 40 thereon which correspond to different values of pressure. Complementary formed indexing means between the disc 36 and the platform 34 insure that the disc will be mounted on the platform in one orientation only. Thus, upstanding from the platform 34 are spaced posts 42 and 44. The post 44 is larger in diameter than the post 42. Provided in the disc are spaced openings which are respectively sized to receive the posts 42 and 44 to insure that the disc is properly mounted on the platform. When the record 36 is so mounted on the platform 34, the pressure graduation below the writing station 38 corresponds to the pressure of the cuff 12. Hence, the record 36 provides a means for calibrating the cuff 12. Additionally, it will be apparent that the record 36 easily may be replaced by another record. Hence, when the blood pressure of a person is taken, in the manner noted below, that particular record is replaced with a blank record thereby providing the examiner with a permanent record of the examination.

The writing station 38 (FIG. 2) includes a housing 46 mounted above the record 36 which has an open bottom. Received within the housing 46 is a solenoid winding 48 having movable core 50. Connected to the bottom of the core 50 by a set screw or the like is a pen 54 of the type which contains its own well so that it will hold an ink supply for a relatively long interval. When the solenoid is energized, the core 50 is caused to move downwardly until the pen 54 engages the record 36 thereby leaving a mark on th record. Since the portion of the record below the writing station 38 corresponds to the pressure of the cuff 12, the mark left on the record 36 by the pen 54 will indicate the pressure of the cuff at that particular instant.

The circuit which energizes the solenoid 48 includes a transducer in the form of a microphone 56. The microphone 56 is positioned in the cuff 12 so that it will detect pulse bearts and convert the pulse beats into electrical signals. As shown in FIG. 4, the microphone 56 is connected to a relatively high gain amplifier 58. The gain of the amplifier and the characteristics of the microphone are selected so that the amplifier will produce an output signal only when the intensity of the pulse beat is equal to or higher than the diastolic pulse beat.

Connected to the output of the amplifier 58, through a blocking capacitor 60, a voltage divider comprising a resistor 62 and a resistor 64 (one end of which is connected to ground) and a diode 66 is a so-called Darlington pair of transistors 68 and 70. The anode of the diode 66 is connected to the junction of the resistors 62 and 64, the cathode of the diode 66 is connected to the base electrode in the transistor 68. The emitter electrode of the transistor 68 is connected to the base electrode of the transistor 70. The emitter electrode 70 is connected to ground. The collector electrodes of the transistors 68 and 70 are connected together and to the positive terminal of a source of potential 72 (the other terminal of which is grounded) through the solenoid winding 48. As is well known in the art, this particular type of circuit connection provides a great current amplification to insure operation of the solenoid 48 and the pen 54 thereby. Hence, pulse beats falling within the range of intensities noted above cause a signal to appear at the output terminals of the amplifier 58. These signals are amplified by the transistors 68 and 70 to energize the solenoid 48 to operate the pen 54.

In operation, the controls 24A and 22A of the respective variable pressure regulating valves 24 and 22 are set by turning the dials on the housing 14 (FIG. 1) to the proper pressures. The cuff 12 is then wrapped around the arm, for example, of the person to be examined and is affixed thereto by any conventional means.

A switch may be operated then to energize the electric circuit elements. (This switch is not shown in FIG. 4 but it is to be understood it is connected in series with the source 72.) Thereafter the valve 20 is operated to connect the tank 16 to the cuff 12. Accordingly, the cuff 12 inflates until the pressure of the cuff operates the valve 22 which closes to prevent further increases in the pressure. As the pressure of the cuff increases, the platform 34 rotates the record 36 past the writing station 38 so that the record reflects the increased pressure in the cuff 12. In practice, the valve 24 is set to open at the pressure the valve 22 is set to close, so that the fluid will begin to be exhausted to the atmosphere when the valve 22 closes. Moreover, this pressure is set substantially above the systolic pressure so that no pulse will be detected until the pressure begins to drop.

As the pressure of the cuff 12 drops, the platform and, therefore, the record 36 begin to rotate in the opposite direction to indicate the lower pressure. When the systolic pressure is reached, the pulse beat is detected by the microphone 56 to cause the pen 54 to engage the record 36 in the manner noted above. Accordingly, since the graudation representing the pressure then in the cuff is below the writing station 38, the systole will be indicated. Moreover, as the pressure continues to decrease, the pen will be caused to engage the record 36 at each succeeding pulse beat thereby producing a series of marks on the record. That is, as the pressure decreases, the graduations representing decreasing pressures pass below the writing station 38 so that the pen 54 engages different portion of the record 36. Finally, when the diastole is reached, no further marks will be made on the record since, as noted above, the device is responsive to pulse intensities equal to or above the pulse beat representative of the diastolic pressure. Thus, the record 36 then may be removed to provide the examiner with a permanent record of the blood pressure of the person undergoing examination.

At this point a new record 36 may be placed on the platform 24, in the proper orientation, and the device again may be utilized to produce a permanent record of the blood pressure of another person.

Accordingly, a blood pressure recroding device has been disclosed which is compact and reliable in operation and which does not rely on the examiner to determine the systole and distole.

While a preferred embodiment of the invention hao been shown and described herein, it will be obvious that numerous omissions, changes and additions may be made in such embodiment without departing from the spirit and scope of the present invention.

What is claimed is:

1. In a blood pressure recording device including a cuff adapted to encircle a limb of a person, pressure means for applying a pressure to said limb, rotatable record support means on said cuff for removably supporting a record and rotating the same in response to the value of pressure applied by said pressure means, indexing means on said support for the record comprising at least two spaced upstanding posts, one of said posts having a larger diameter than the other and each post being spaced from the center of said support means, writing means for writing on said record, and actuating means for operating said writing means to write on said record in response to pulse beats having an intensity equal to or higher than the diastolic pulse beat; the improvement comprising said record being circular in shape and having an imperforate center and pressure designation indicia on the record corresponding to the pressures applied to the limb by said pressure means, and indexing means on said record cooperable with said indexing means on said support means for mounting the record thereon in a preselected orientation whereby the pressure designation indicia on the record corresponding to the pressure applied to the limb is adapted to be aligned with said writing means, and said indexing means on said record comprising spaced bores extending through the record, each of said bores being spaced a preselected distance from the center of the record, said respective bores having different diameters for receiving a respective one of said posts whereby the record is adapted to be mounted on said record support.

* * * * *